(12) United States Patent
Jeltsch et al.

(10) Patent No.: US 7,883,659 B2
(45) Date of Patent: Feb. 8, 2011

(54) METHOD FOR EQUALIZING THE ORIENTATION OF FILLERS AND/OR DISTRIBUTION OF FILLERS IN INJECTION MOULDED PARTS

(75) Inventors: Thomas Jeltsch, Domat/Ems (CH); Werner Kägi, Domat/Ems (CH)

(73) Assignee: EMS-Chemie AG, Domat/Ems (CH)

( * ) Notice: Subject to any disclaimer, the term of this patent is extended or adjusted under 35 U.S.C. 154(b) by 524 days.

(21) Appl. No.: 11/445,419

(22) Filed: Jun. 1, 2006

(65) Prior Publication Data

US 2007/0023972 A1    Feb. 1, 2007

(30) Foreign Application Priority Data

Jun. 2, 2005    (DE) .............. 10 2005 025 461

(51) Int. Cl.
  *B06B 1/02*    (2006.01)
  *H05B 6/00*    (2006.01)
  *B29B 7/00*    (2006.01)
  *B29C 45/00*   (2006.01)
  *B29C 67/00*   (2006.01)
  *A63B 37/00*   (2006.01)
  *B28B 17/00*   (2006.01)

(52) U.S. Cl. ............ 264/443; 264/442; 264/478; 264/328.12; 264/279.1; 264/328.18; 264/437; 425/174.2

(58) Field of Classification Search ............... 264/443, 264/442, 328.18, 478, 437; 425/174, 174.2
See application file for complete search history.

(56) References Cited

U.S. PATENT DOCUMENTS

| 5,017,311 A | * | 5/1991 | Furusawa et al. | 264/443 |
| 5,093,050 A | * | 3/1992 | Tepic | 264/415 |
| 5,538,413 A | * | 7/1996 | Gardner et al. | 425/145 |
| 5,840,241 A | * | 11/1998 | Bishop et al. | 264/437 |

* cited by examiner

*Primary Examiner*—Christina Johnson
*Assistant Examiner*—Benjamin Schiffman
(74) *Attorney, Agent, or Firm*—Marshall & Melhorn, LLC

(57) ABSTRACT

The present invention relates to a method for equalizing the orientation of fillers and/or distribution of fillers in a molding compound comprising filled plastic material of an injection molded part. A method of this type is required in particular during injection molding.

The method according to the invention is characterized in that the injection mold and the molding compound are supplied with sound during injection molding in the injection mold. The sound has a frequency in the range of the spectrum of the first ten natural frequencies of the filler-matrix system. By supplying with this sound, the fillers, for example fibers, are distributed within the injection molding compound in a more isotropic manner with respect to their orientation and distribution so that significantly better mechanical and optical properties of the injection molded part are produced.

15 Claims, No Drawings

METHOD FOR EQUALIZING THE ORIENTATION OF FILLERS AND/OR DISTRIBUTION OF FILLERS IN INJECTION MOULDED PARTS

BACKGROUND OF THE INVENTION

The present invention relates to a method for equalising the orientation of fillers and/or distribution of fillers in a moulding compound comprising filled plastic material of an injection moulded part, in particular for making the fibre orientation isotropic in a fibre-reinforced moulding compound. The reinforcing materials can comprise for example glass, carbon, ceramics, aramide or other materials. There should be understood by the term "fibre reinforcement" also materials with fibre-like, oblong or also plate-like shape. It concerns furthermore a corresponding injection moulding method, uses of these methods and also corresponding injection moulded parts. Injection moulded parts of this type are used for example as components in the automobile industry. There they replace previously metallic components since they have an advantage relative to these not only because of their low specific weight but also, by introducing various components, their mechanical and thermal properties can be correspondingly adapted to the respective loading of the component.

Filled plastic materials are used for components of this type. The moulding compound thereby contains a thermoplastic and also a filler. As filler, fillers of any shape, for example oblong or spherical particles, can be used.

An important example of plastic materials filled in this way are fibre-reinforced moulding compounds which contain a thermoplastic and are reinforced by fibres, in particular glass fibres.

If moulding compounds of this type are injected in the molten state into an injection moulding tool, then the result during filling of the cavity by the melt flow is an orientation of the fillers and/or unequal distribution of the fillers within the plastic material matrix. Strong shear and extensional flows which cause an orientation of the filler particles or separation inter alia are responsible. This leads to anisotropic properties of the component with respect for example to its strength, rigidity, shrinkage or even thermal conductivity and expansion. The anisotropic shrinkage is in turn the main cause of component distortion, as is found frequently in fibre-reinforced injection moulded parts. In the flow shadow of flow impediments, a particularly pronounced anisotropy occurs. Joint lines, as are unavoidable in a multiplicity of moulds in injection moulding technology, in fact form fibre orientations parallel to the course of the joint line so that these regions, during stressing perpendicular to the joint line, have strength merely of the order of magnitude of the non-reinforced or non-filled matrix material.

Further problems which are produced by the rheological orientation mechanisms of the injection moulding melt are known with plate-like reinforcing materials or effect pigments. For example, mineral reinforcements are inclined to migrate in regions of great shear orientation towards the component surface. This leads to optical impairment of the component. In the case of injection moulding materials and in particular in the case of transparent thermoplastics which are doped with plate-like pigments, e.g. metallic micas, the rheological orientation of the pigment particles is found to be particularly disruptive in the joint line regions or regions of pronounced shear- and extensional flows. The preferred orientation of the pigments with respect to the surface is disrupted and a significant impairment in the optically homogeneous appearance occurs. Disruptions of this type in the optical appearance are for example described in EP 0 994 915 B1 or also in U.S. Pat. No. 6,194,507 B 1, the solution to this problem being however sought constantly in an improved mixing of pigment and plastic material matrix.

These problems are already known in particular for fibre-reinforced plastic materials and various methods are revealed in the state of the art with which an isotropic fibre orientation is striven for. Thus this problem is mentioned for example in "Kunststoffe" November 2004, pages 72 to 74. In "Plastverarbeiter" 2003, volume 54, no. 6, page 38 to 39, it is proposed in order to solve this problem to place the joint lines in less critical regions of a component. This publication proposes as a further possible improvement to use counter-cycle injection moulding or the Scorim method. As a further possibility, the cavity can be filled over a plurality of sections with temporally delayed opening in a so-called cascade arrangement. Further alternatives are revealed, such as for example setting a different dwell pressure on both sides of a flow line. As a result of the consequently produced different shrinkage on both sides of the flow line, a non-orthogonal orientation of the fibres is sought.

Furthermore, the equalisation of the orientation of polymer molecule chains in the melt state by ultrasound during injection moulding of an optical disc made of polycarbonate, however without the presence of fillers, is known from JP 62249717A.

However none of the methods mentioned here is suitable for making the fibres satisfactorily and adequately isotropic and hence effecting a sufficient strength increase in the injection moulded part.

Similar problems are also known in the case of pigment-filled plastic materials, e.g. with effect pigments, such as metallic micas or aluminium flakes in which, because of unequal distribution and orientation of the pigments, joint lines and flow lines remain visible in injection moulded parts comprising a transparent plastic material. This is known for example from mirror shells (rear mirror housings) in the automobile industry.

Because of high shear forces which can occur close to the sprue, migration of mineral reinforcements was already observed at the sprue point of injection moulded parts.

It is therefore the object of the present invention to make available a method for equalising the orientation of fillers and/or distribution of fillers in an injection moulded part or for increasing the strength of an injection moulded part.

This object is achieved by the method according to claim 1. Advantageous developments of the method are indicated in the dependent claims.

BRIEF SUMMARY OF THE INVENTION

It is now crucial in the present invention that it was detected that the orientation of fillers and/or distribution of fillers in a moulding compound comprising filled plastic material which is introduced into an injection mould, can be decisively improved (e.g. made isotropic) if the moulding compound is supplied with sound during injection into the injection mould, the frequency of which is in the range of the spectrum of the first 10 natural frequencies of the filler matrix system, in particular between 3 kHz and 1 GHz. Sound of this type is partially in the upper range of the still audible spectrum and partially in the ultrasonic range. In the following, the term "ultrasonic" is however used for the entire spectrum from 3 kHz to 1 GHz. For this purpose, a sound generator (or a plurality also) can be disposed for example on the injection mould, said sound generator supplying the entire mould cavity or also only local partial regions thereof with sound. Due to the sound, the rheologically caused unequal distribution and orientation of the fillers is at least partially counteracted and hence the anisotropy of the distribution and orientation of the fillers is reduced. It is particularly advantageous if this solution according to the invention is applied to forming joint lines since, as a result, the joint line strength transversely relative to the flow line direction can be increased and hence the regions which are critical for the total strength of the component can be significantly increased.

The sound impingement can be continued also in the cooling and solidifying phase of the moulding compound. As a result, the crystallinity and hence the strength of the injection moulded part are also increased in addition. In a particular variant, the sound output is adjusted such that usable heat is produced via the material oscillation and hence the cooling process of the melt can be slowed down or controlled.

The background to the present invention, as is presented here in the example of a fibre-reinforced plastic material, is that the fibre-matrix system, due to the density and elastic modulus difference between the fibres and the matrix, for example a thermoplastic, is capable of oscillation. In particular in the molten state of the matrix, the fibres are relatively freely moveable and can correspondingly adopt natural oscillation forms. With suitable oscillators, the fibres can therefore be excited across the cavity during injection such that, according to the law of entropy increase, a less pronounced or virtually uncontrolled fibre orientation state is produced.

This argument applies similarly to the equalisation according to the invention of the orientation and distribution of fillers formed in any other manner. Hence the above-described migration of plate-like reinforcing materials or fillers towards the component surface can be reduced or prevented. Also the visibility of flow lines and joint lines in moulding compounds filled with plate-like pigments is influenced so that an optically homogeneous appearance is produced.

Advantageously, a sound frequency or a frequency spectrum can be used which corresponds to the main resonance frequencies of the filler-matrix system in the melt state. If natural forms and natural frequencies of this type are calculated for example in a simplified fibre-matrix model, then a great dependency of the natural frequencies for example upon the rigidity ratio between filler and matrix is revealed. For conditions such as can be encountered typically in the case of glass fibre-reinforced moulding compounds in the melt state, the first six natural frequencies in the range of conventional ultrasound are calculated. For this range, technically easily achievable oscillators (sonotrodes) are available. It is therefore particularly advantageous if the injection mould or the filled plastic material in the melt state is supplied with sound during injection into the mould at a frequency which is in the range of the resonance frequencies of the filled plastic material and/or of the filler in the filled plastic material. Sound frequencies between 3 kHz and 1 GHz, preferably between 15 kHz and 10 MHz and particularly preferred between 20 kHz and 60 kHz are suitable for this purpose.

DESCRIPTION OF THE PREFERRED EMBODIMENT

In contrast to the state of the art, the present invention consequently seeks the solution for equalisation of the orientation of fillers and/or distribution of the fillers in that the underlying problem, the anisotropy of the filler, is tackled, not in a less disadvantageous arrangement of the furthermore weak flow joints or in a special design of injection of the moulding compound. Rather the isotropy and for example hence the strength of the injection moulded part and/or the optical appearance is improved by special treatment of the moulding compound during injection in the molten state and if necessary also during the solidifying and cooling phase. It is therefore derived technically more from the same already known materials without any change to the design of the injection moulded part and also to the construction principle of the injection mould. The fact that the application of sound of this type improves the distribution and orientation of the fillers of the injection moulded parts is neither known nor obvious in the state of the art.

As matrix material, all polymers which are suitable for injection moulding, such as thermoplastics, duroplastics or vulcanising elastomers or blends thereof, e.g. mixtures or alloys, are suitable. Suitable thermoplastics are homopolyamides, copolyamides or polymer blends thereof. Also the use of polystyrenes, polyolefins, cellulose esters, cellulose ethers, polymethacrylic acid esters and the like are possible. There can be used for the method according to the invention, for example polyamides (preferably PA 46, PA 6, PA 66, PA 612, PA 11, PA 12, partially aromatic polyamides, such as e.g. PA 6T/6I, PA 6I/6T/66, PA 6T/66 or PA 9T, and transparent polyamides), polyesters (preferably PET, PBT, PEN and PBN), polycarbonates, polyolefins (preferably PE and PP), polyoxymethylene (POM) and transparent polymers (preferably ABS, SAN, PC, PMMA etc., in addition to the already-mentioned transparent polyamides). Also possible are blends (mixtures and the like) of such polymers with the mentioned or further polymers.

Preferred transparent polyamides are those with cycloaliphatic monomer constitutional units, such as polyamide PACM 12 and polyamide MACM 12 and also corresponding copolyamides and alloys of these polyamides together. With respect to nomenclature, reference is made to S. Schaaf; Polyamide, "Werkstoffe für die High-Technology und das moderne Leben", Verlag moderne Industrie, Landsberg 1997. For components with effect pigments, Grilamid® TR, a transparent polyamide which can be obtained from EMS-CHEMIE AG, CH-7013 Domat/Ems, is used particularly preferably.

For particularly rigid, dimensionally-stable moulded parts, Grivory® GV and HT, a glass fibre-reinforced, partially aromatic polyamide obtainable from EMS-CHEMIE AG, CH-7013 Domat/Ems, can be used.

As material for the technical injection moulding production of the above-described moulds, there are suitable inter alia thermoplastic plastic materials, in particular those comprising a glass fibre-reinforced polymer, the polymer being selected advantageously from the group of polyamides and copolyamides and having a melting point of at least 250° C., such as e.g. PA66 and PA46. The use of a polymer which concerns a partially aromatic, partially crystalline copolyamide with a melting point in the range of 300° C. to 350° C. is particularly preferred. A particularly well suited glass fibre-reinforced polymer of this type is for example available commercially with the name "Grivory® HTV-5H1" from the company EMS-CHEMIE AG/EMS-GRIVORY, Domat/Ems, Switzerland. The material is suitable in particular for producing extremely rigid, strong, heat-resistant and dimensionally precise injection moulded parts and is distinguished in addition by very good chemical resistance.

The plastic materials which are used can of course contain the normal additives, such as plasticisers, impact strength modifiers, stabilisers, flameproofing agents, anti-static agents (carbon black, carbon fibres, graphite fibrils), reinforcing fibres, pigments, minerals, nanocomposites, colourants, etc., these additives representing fillers in the sense of the present invention.

As fillers, in addition fillers shaped in any manner can be used, for example pigments, in particular however also fibres in a fibre-reinforced moulding compound, for example glass fibres, carbon fibres, aramide fibres and/or ceramic fibres.

Composite materials of this type are known for their good shapeability and high mechanical strength.

The sound impingement can be effected in the case of the present invention either at a fixed frequency or constant frequency spectrum, or sound generators with adjustable frequency or adjustable frequency spectrum can be used. With the latter, the frequency can be changed in the range under consideration continuously or non-continuously so that the respective moulding compound can be impinged upon at the frequency which is optimal for this moulding compound.

The sound source (sonotrode) can also be disposed particularly advantageously at a specific site of the injection mould, for example adjacent to a flow line so that the forming flow line is impinged upon locally with sound. For example in the case of a flow line which is forming behind a web or a mandrel, a transmitter can be disposed in the region behind the web or the mandrel. A plurality of transmitters (sonotrodes) can also be used at various positions of the injection mould. An arrangement with two sonotrodes which oscillate in counter-cycle is advantageous.

Injection moulded parts produced according to the invention are used in a versatile manner, for example in the automobile industry as a replacement for previously metallic parts. However also any other injection moulded part which is subjected during use to a mechanical load (e.g. tension or pressure) or to a thermal load (e.g. high or low temperatures, great temperature changes, thermal deformation) can be significantly improved in its relevant properties by the method according to the invention.

The optical appearance of the surface also plays an important role in many injection moulded parts. In particular when using effect pigments in transparent polymers in order to achieve for example a metallic effect (e.g. with exterior rear mirror housings in cars), disruptive flow lines or joint lines can appear due to the orientation or concentration differences. Such optical irregularities on the moulded part surface can be counteracted also according to the invention by sound or ultrasound.

The invention claimed is:

1. Method for equalizing the orientation of fillers or distribution of fillers in a molding compound containing a filled plastic material of an injection molded part which is produced in an injection mould and contains the molding compound, the injection mold and the molding compound being supplied with sound during the injection molding in the injection mould, wherein the sound is supplied in at least one region in which the molding compound forms a joint line with the fillers in this region being substantially anisotropic, and the sound has a frequency spectrum which corresponds 20 the main resonance frequencies of the filler-matrix system in the melt state, with which the isotropy of the fillers in the region of the joint line is increased.

2. Method according to claim 1, wherein the injection mould and the molding compound are supplied with sound during injection of the molding compound and if necessary in addition during the solidifying or cooling phase of the molding compound.

3. Method according to claim 1, wherein the injection mould is supplied with sound at a frequency spectrum between 3 kHz and 1 GHz.

4. Method according to claim 3, wherein the injection mould is supplied with sound at a frequency spectrum between 15 kHz and 10 MHz.

5. Method according to claim 4, wherein the injection mould is supplied with sound at a frequency spectrum between 20 kHz and 60 KHz.

6. Method according to claim 1, wherein the injection mould is supplied with sound at frequencies which deviate from the resonance frequencies of the molding compound and/or of the fillers in the molding compound by at most 10%.

7. Method according to claim 1, wherein the molding compound contains at least one of thermoplastics, duroplastics, vulcanizing elastomers and blends thereof as matrix component of the filled plastic material.

8. Method according to claim 7, wherein the molding compound contains thermoplastics selected from the group consisting of: polyamides, polystyrenes, polyolefins, polyesters, polycarbonates, cellulose esters, cellulose ethers, polymethacrylic acid esters, polyoxymethylenes, fluorocarbon polymers and blends thereof.

9. Method according to claim 7, wherein the molding compound contains thermoplastic selected from the group consisting of: a homopolyamide, a copolyamide and polymer blends thereof.

10. Method according to claim 9, wherein the thermoplastic plastic material is selected from the group consisting of: polyamide 46 (PA 46), polyamide 6 (PA 6), polyamide 66 (PA 66), polyamide 612 (PA 612), polyamide 11 (PA 11), polyamide 12 (PA 12), partially aromatic polyamides, transparent polyamides, transparent polymers, SAN, polycarbonate (PC), polymethylmethacrylate (PMMA), polyethylene terephthalate (PET), polybutylene terephthalate (PBT), polyethylene naphthalate (PEN), polybutylene naphthalate (PBN), polyolefins and mixtures thereof.

11. Method according to claim 7, which the matrix component is transparent.

12. Method according to claim 1, wherein the fillers comprise at least partially one of the materials from the following group, oblong particles, spherical particles, plate-shaped particles, fibrous particles, pigment particles in any or in the mentioned forms and mineral particles in any or the mentioned forms, additives, such as plasticizers, impact strength modifiers, stabilizers, flameproofing agents, anti-static agents, reinforcing fibers, pigments, minerals, nanocomposites, colourants.

13. Method according to claim 1, wherein the fillers are at least partially fibers and the molding compound is a fiber-reinforced molding compound.

14. Method according to claim 13, wherein the fiber reinforcement of the fiber-reinforced molding compound contains as filler at least one of, glass fibers, carbon fibers, aramide fibers and ceramic fibers.

15. Method for equalizing the orientation of fillers or distribution of fillers in a molding compound containing a filled plastic material of an injection molded part which is produced in an injection mould and contains the molding compound, the injection mold and the molding compound being supplied with sound during the injection molding in the injection mould, wherein the sound is supplied in at least one region in which the molding compound forms a joint line with the fillers in this region being substantially anisotropic, and the sound has a frequency spectrum which corresponds to the main resonance frequencies of the filler-matrix system in the melt state, with which the isotropy of the fillers in the region of the joint line is increased; and wherein the molding compound contains at least one of thermoplastics, duroplastics, vulcanizing elastomers and blends thereof as matrix component of the filled plastic material; and wherein the fillers are at least partially fibers and the molding compound is a fiber-reinforced molding compound.

* * * * *